May 31, 1938.   W. B. FAGEOL   2,118,812
DRIVING MECHANISM
Original Filed April 9, 1935   4 Sheets-Sheet 1
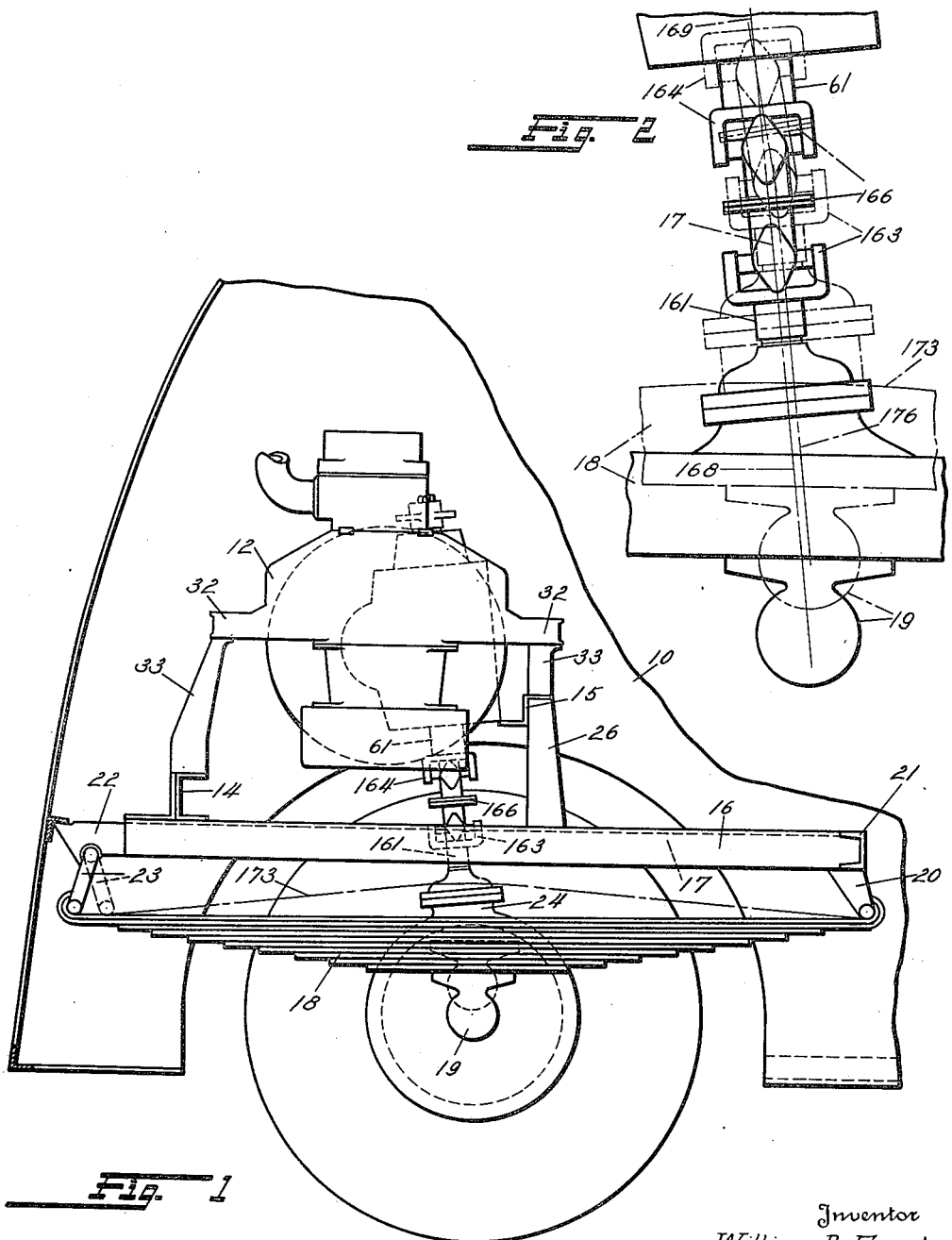
Inventor
William B. Fageol
By Strauch & Hoffman
Attorneys

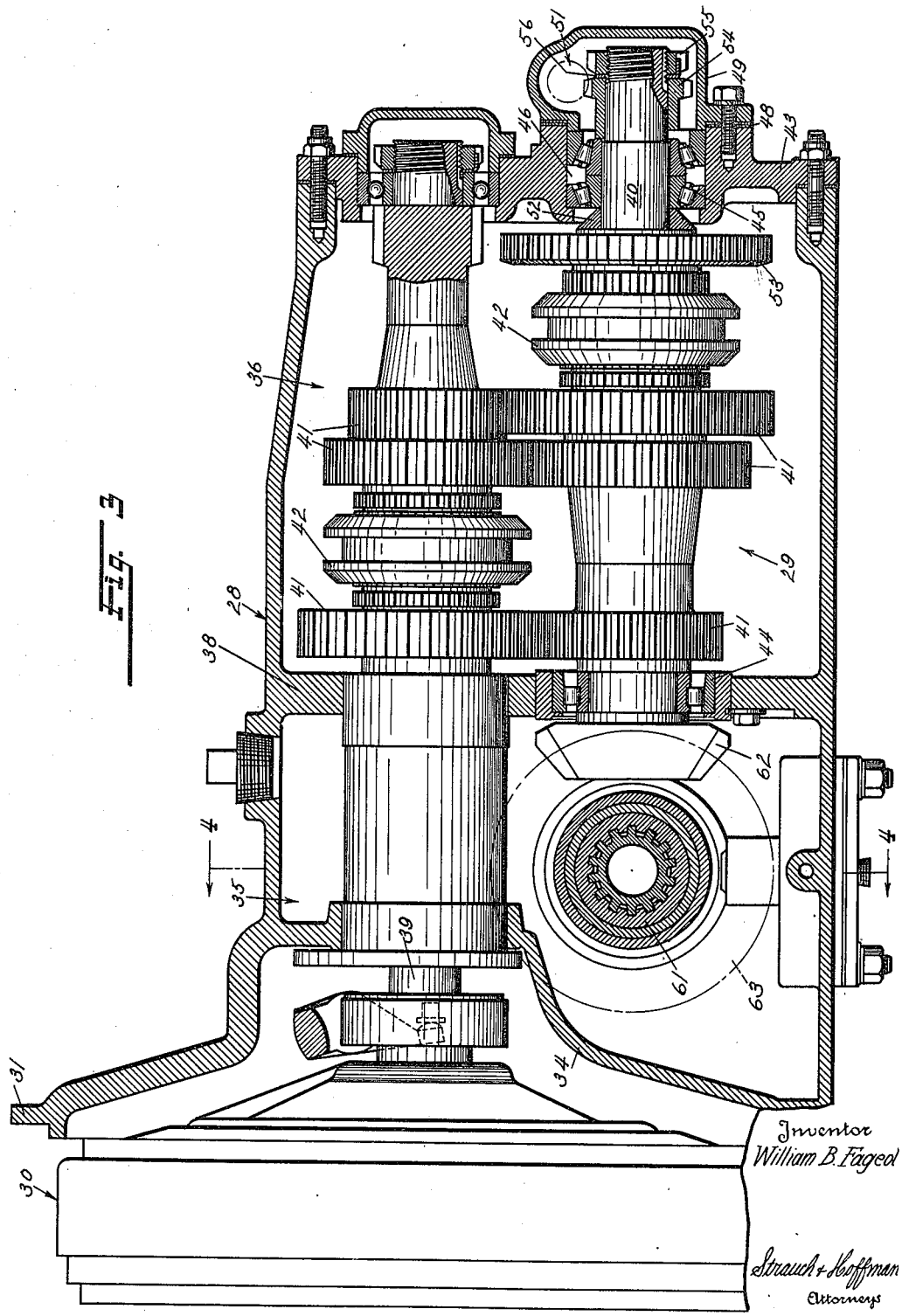

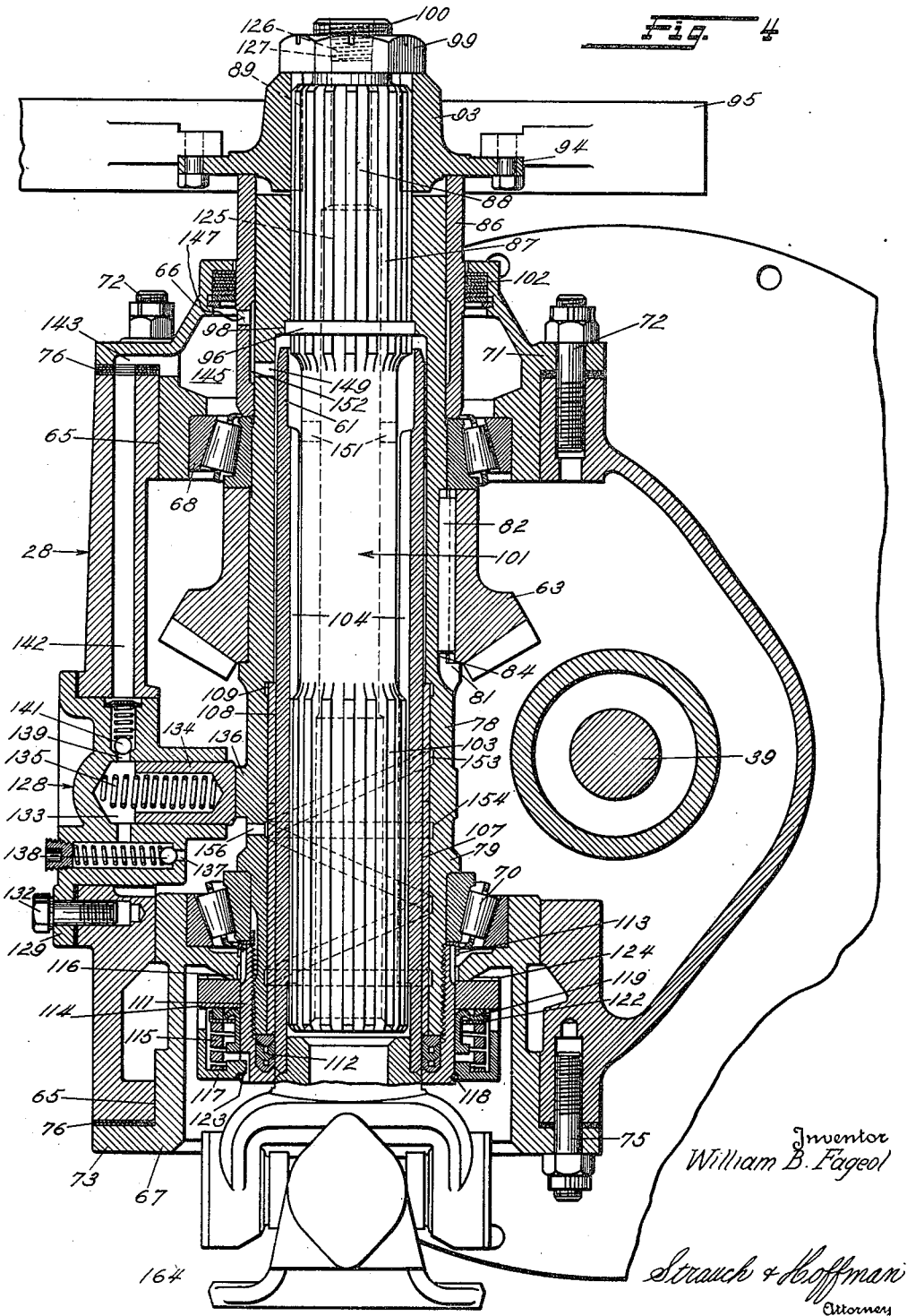

May 31, 1938. W. B. FAGEOL 2,118,812
DRIVING MECHANISM
Original Filed April 9, 1935 4 Sheets-Sheet 4

Inventor
William B. Fageol
By
Strauch & Hoffman
Attorneys

Patented May 31, 1938

2,118,812

UNITED STATES PATENT OFFICE 2,118,812

DRIVING MECHANISM

William B. Fageol, Kent, Ohio, assignor to Twin Coach Company, Kent, Ohio, a corporation of Delaware Original application April 9, 1935, Serial No. 15,488. Divided and this application April 22, 1936, Serial No. 75,819

16 Claims. (Cl. 180—70)

The present invention relates to a driving mechanism for motor vehicles, and more particularly to a novel power and drive mechanism for driving the wheels of a motor bus or the like from an engine located substantially above said wheels. The novel drive means disclosed herein constitute subject matter divided out of my co-pending patent application Serial No. 15,488, filed April 9, 1935 and are particularly adapted for use in conjunction with the low floor rear drive vehicle disclosed in my copending patent application Serial No. 15,085 filed April 6, 1935.

It is a primary object of the invention disclosed herein to provide a novel vehicle driving mechanism embodying a transmission positioned above the axis of the vehicle wheels and a substantially vertical drive shaft interconnecting the transmission and the vehicle drive mechanism. Preferably the axis of said drive shaft is disposed in a vertical plane extending longitudinally of the vehicle at right angles to the axle, but it may be swung out of said plane if desired.

Still another object of the present invention is to locate the driving motor in a novel manner above the driving axle in a vehicle and to provide a novel driving connection between the power transmission means associated with the motor and the rear axle.

It is still another object of the present invention to provide a flexible and extensible drive connection between an unsprung drive axle and a sprung motor located thereabove.

Still another object of the present invention is to provide in a vehicle driving mechanism, a novel means for driving the transmission power take-off shaft which permits relatively free longitudinal movement of said shaft while at the same time relieving the driving means of side thrust.

Another object of the present invention is to provide a novel power and drive mechanism for a vehicle in which the vehicle driving motor is located substantially above the axis of the vehicle driving wheels and in which power is transmitted to the driving wheels from a differential mechanism associated with the motor by means of flexible driving connections.

Further objects of the invention will appear from the following description and appended claims when taken in connection with the accompanying drawings wherein:

Figure 1 is a fragmentary side elevation of one end of a vehicle with a side wall removed to show a power plant and driven arrangement embodying the present invention;

Figure 2 is an enlarged view of a part of the mechanism illustrated in Figure 1, in several positions of extensibility during operation;

Figure 3 is a horizontal section, taken transversely of the vehicle, of the transmission used in the power plant of Figure 1;

Figure 4 is a vertical sectional view, taken on line 4—4 of Figure 3, and illustrates details of the extensible driving connection for the vehicle propeller shaft.

Figure 5:
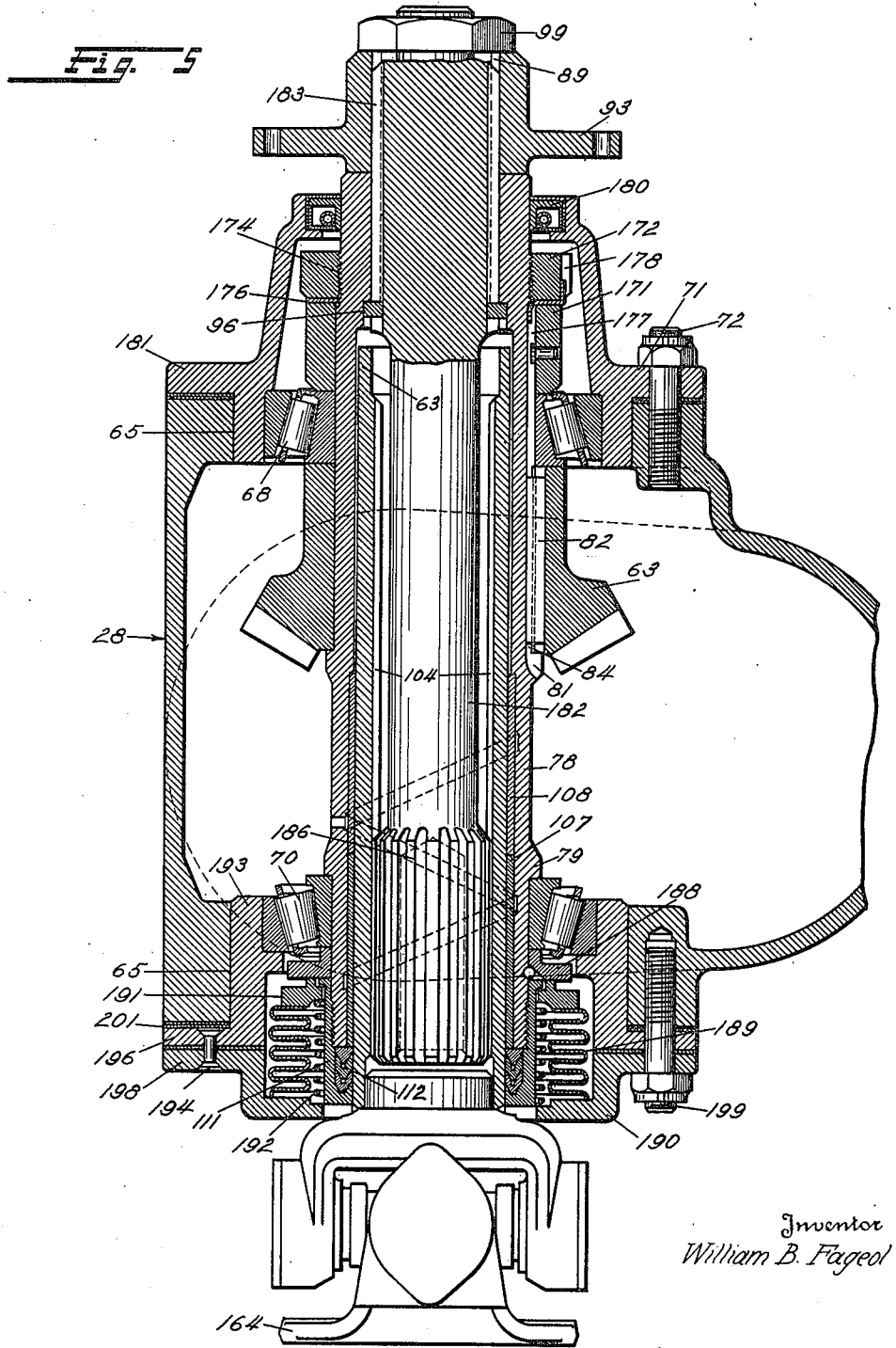
Figure 5 is a view similar to Figure 4 and illustrates a modified form of extensible driving shaft mechanism.

With continued reference to the drawings, in which like reference numerals designate similar parts throughout the several views, the numeral 10 (Figure 1) denotes generally the body and framing of a motor vehicle such as that disclosed in my copending application Serial No. 15,085, referred to above. The frame 10 forms the support for a motor 12 and includes motor supporting members 14 and 15 located transversely of the vehicle, and longitudinal members 16 and 17. Vehicle springs 18, which support the vehicle frame on a driving axle 19, are pivotally secured to the vehicle at their front ends by means of inverted U-shaped brackets 20 which are secured to the underside of the frame member 21. The projecting portions of the members 16 and 17 form a support for the other ends of the springs 18, and for this purpose each projecting portion is provided with a bracket 22 in which one end of a spring shackle 23 is pivoted. One end of each spring 18 is pivotally secured to its bracket 20 and the other end is secured in well known manner to its shackle 23. Members 16 and 17 are secured directly to member 14 and to the transverse framing member 21,—the latter being carried by brackets secured in a suitable manner to the side frame members of the body base or sub-frame—, and to the member 15 by vertical posts 26.

The driving axle 19 may be of usual construction and is provided with a differential unit 24 disposed between the springs 18. As will be seen later, the power out-put shaft of the transverse power plant is not located exactly intermediate the ends thereof and therefore, as it is desirable to have said shaft arranged in a plane longitudinally of the vehicle, the differential unit will in most instances be located offset from the center or middle of the axle.

The motor 12 is secured at one end to a casing 28 (Figure 3), which houses a transmission mechanism 29 and a clutch 30. These units are positioned in line transversely of the vehicle above the drive axle 19. A flange 31 on casing 28 is adapted to be connected to the crank case of the engine 12 whereby the engine, the clutch and the transmission mechanism comprise a unitary structure. The engine is provided with brackets 32 which are connected to upstanding supports 33 carried by the transverse members 14 and 15.

Referring to Figure 3, which shows the interior of casing 28, a wall 34 in the end of the casing adjacent the clutch 30 separates the interior of the casing from the clutch and the crank case of engine 12, and the casing is divided into two parts or sections 35 and 36 by a partition wall 38. The section or compartment 36 contains a change speed transmission 29, and section 35 is devoted to housing the extensible final drive connection later to be described.

The engine crank shaft is connected through clutch 30, which may be of conventional form, to shaft 39 of the change speed transmission mechanism 29, which preferably takes the form of that shown in my copending application Serial No. 15,488. The change speed transmission 29 has a counter-shaft 40 driven from the main shaft 39 at selectable relative speeds through a series of gears 41 and clutching devices 42 described in detail in copending application Serial No. 15,488.

The counter-shaft 40 is journaled in the wall 38 and an end cover plate 43 by bearings 44 and 45. The bearing 45 is a combined radial and anti-frictional bearing, the outer race members of which are carried in a recess 46 formed in the cover member 43. The axial spacing of the outer bearing race members may be varied by removing or inserting shims 48 under the flange of a cap member 49 which houses a speedometer drive 51. The inner race members for bearings 44 are in abutment with each other and are positioned axially on shaft 40 by contacting one of the inner race members with a spacing collar 52, the position of which is variable by removing or replacing shims between said spacing collar and the end of a gear 53 which is keyed or otherwise secured upon shaft 40. The inner race members are pressed against each other and spacing collar 52 by the hub of a speedometer drive gear 54, which is retained in position on the shaft 40 by means of a nut 55 and a locking device 56.

The flexible and extensible connection between the transmission 29 and the drive axle briefly mentioned above will now be described in detail.

The angular position of the casing 28 with respect to the internal combustion engine 12 is such that a power take-off shaft 61, (Figures 1 and 4) which extends from the side of the casing and which is substantially vertical or inclined slightly from the vertical, while disposed in a plane longitudinally of the vehicle, as illustrated in Figure 1 of the drawings. The power take-off shaft 61 is driven from a bevel or mitre gear 62 on the counter-shaft 40 of transmission mechanism 29, the said gear being in mesh with a bevel gear 63. One form of mechanism by which the intermeshed bevel gears may derive power from the engine will be apparent from an inspection of my copending application Serial No. 729,115, filed June 5, 1934. The gear 63 is a part of the novel mechanism to be described in detail, the said mechanism allowing shaft 61 to move axially as springs 18 are deflected.

Referring to Figure 4 of the drawings, section 35 of the housing 28 is provided with a pair of co-axial openings 65 at the top and bottom to receive upper and lower bearing carriers or housings 66 and 67 respectively, for a pair of combined thrust and anti-friction bearings, 68 and 70 respectively. The upper bearing carrier 66 is provided with a flange 71 which is apertured to receive a series of studs 72 or other suitable securing devices by means of which the bearing carrier is secured within its opening 65. The lower bearing housing 67 is likewise flanged as indicated at 73, the said flange seating against the end of the corresponding aperture 65. The flange 73 is apertured for the purpose of receiving studs 75, by means of which the member 67 is secured in position. Shims 76 are placed beneath the flanges 71 and 73 of the bearing carriers and removal or replacement of these shims provides a ready means for adjusting the bearings 68 and 70. A hollow shaft 78 is shouldered as shown at 79 to provide an abutment for the inner race of the bearing assembly 70 by which it is rotatably supported adjacent one end within the bearing housing 67. A shoulder 81 provides an abutment for the gear 63, which is received on the hollow shaft 78 and is keyed to said shaft by means of a key 82 seated in a keyway 84 and the complemental keyway in the gear. The inner race member of the bearing assembly 68 which is also received over the hollow shaft 78, abuts the upper axial face of the gear 63. A sleeve 86 abuts the inner race member of the bearing assembly 68 and projects upwardly beyond the end of the shaft 78.

A shaft 87, having a set of splines 88 adjacent one end thereof, projects within the hollow shaft 78. Splines 88 are engaged with a set of internal splines 89 formed on the interior of shaft 78 at its end.

The shaft 87 projects beyond the end of the hollow shaft 78 and receives an internally splined member 93. The member 93 is provided with a radial flange 94 which may be connected in any suitable manner to a brake drum or friction disk 95 for cooperation with brake shoes to assist in retarding movement of the vehicle or holding it stationary. A split washer 96, positioned on the splined portion of the shaft 87, seats in a recess 98 in the shaft 78 and provides an abutment whereby a nut 99 on the threaded extension 100 can be used to hold the shaft 87 securely in position while also clamping the member 93 against the axial face of the member 86. The shaft 78 and shaft 87, assembled as above pointed out, in conjunction with shaft 61 provide an extensible propeller shaft 101.

It will be seen from the description given thus far that the gear 63 and the inner race member of the bearing assembly 68 are also clamped together axially on the shaft 78 by means of the nut 99. A seal 102, positioned at the top of the bearing housing 66, prevents escape of lubricant from about the shaft 78.

The shaft 87 is provided with an externally splined portion 103 at its end opposite splines 88. The shaft 61 is internally splined, as indicated at 104, and the shaft 61 is driven by interengagement of the splines 103 and 104 while permitting the shaft 61 to be capable of axial movement within the interior of the hollow shaft 78. Shaft 61 is guided for sliding movement by bearing sleeves 107 and 108 which preferably are of the oilless type and held in position against a shoulder 109 by a threaded sleeve 111 that is engaged over the end of the hollow shaft 78. Packing members or wipers 112, carried in a recess at the end of member 111, prevent escape of lubricant from around shaft 61 when it is moved axially in response to movements of the vehicle driving axle.

The member 111 serves to hold the inner race member of bearing assembly 70 against the shoulder 79 on the hollow shaft, and member 111 is locked against turning, by a locking member 113 which is interposed between the bearing race and the end of the member 111.

Escape of lubricant from the casing 28 about the lower end of shaft 78 is prevented by a sealing member 114 which is pressed by a spring 115 against a flange 116 on the interior of the member 67. One end of spring 115 seats in a recess in a cap member 117 secured on one end of the member 111 by a ring 118. The other end of the spring presses upwardly against an annular sealing member 119 which in turn urges the sealing member 114 against flange 116. The flanged top of the sealing member 119 is provided with a backing 122 against which the spring bears. Rotation of the member 117 and the sealing member 114, is assured by tongues 123 and 124.

The splined connection, comprising the splined portion 104 of shaft 61 and the spline 103 on shaft 87, is lubricated by a lubricant introduced into the hollow interior 125 of shaft 87 upon removal of a threaded filling plug 126 which is screwed into an internally threaded passage 127. A supply of lubricant for bearing 68 is assured by means of a lubricant pump 128, the body of which is received in an aperture in the side of the casing 28. The body of the pump is provided with a flange 129 which is secured against a boss on the casing 28 by means of studs 132. A cylindrical bore 133 is provided within the body of the pump, a plunger 134 being slidably positioned within said cylindrical bore. A spring 135 urges the plunger 134 outwardly against a cam 136 formed on the hollow shaft 78. The pump intake 137 is closed by a spring pressed ball check valve 138, and the pump discharges through an outlet port 139 which is closed at times by a spring pressed ball check valve 141. The pump discharges lubricant into a passage 142 in the wall of housing 28, which communicates with a passage 143 formed by a recess in the member 66. The passage 143 communicates with the hollow space 145 above the bearing 68.

If desired, a port 147 may be provided in the annular wall of member 86 which communicates with a port 149 in the shaft 78 by means of a groove 152. The ports 147, 149 and the groove 152 assure a supply of lubricant to the bearing sleeves 107 and 108, and the splines 103 and 104 may be lubricated by lubricant flowing from the port 149 and over the top edge of the shaft 61. Surplus lubricant within the bore 125 is removed by means of ports 151. The port 147, which communicates with the hollow space 145 by means of the grooves 152 and the port 149, serves as an air vent and overflow for the interior of the hollow shaft 61. The ports 151 permit lubricant to flow out of the bore 125 directly onto the splines 103 and 104. A supply of lubricant to the bearing members 107 and 108 is secured by means of a helical channel 153 and circular channels 154. Lubricant is supplied to these channels through a port 156 in the wall of the shaft 78.

As the shaft 78 rotates, the high part of the cam 136 forces the pump plunger 134 to the left, forcing lubricant contained within the bore 133 past the ball valve 141 into the passage 142 from which it finds its way to the bearing 68. As the shaft 78 continuously rotates the low portion of the cam 136 comes opposite the plunger 134 and the spring 135, by forcing the plunger out causes lubricant to be drawn into the bore 133 past the ball check 138. This cycle of operation is repeated as the shaft 78 continues to revolve, thereby assuring a supply of lubricant to the bearing 68.

The telescoping driving connection just described thus is completely sealed against the admission of all road dirt and dust and is thoroughly lubricated in a positive manner.

The power take-off shaft transmits driving power to a propeller shaft 161 (Figure 1) which extends upwardly from the differential mechanism 24 of the rear drive axle 19. The propeller shaft and the power take-off shaft 71 are interconnected through a pair of universal joints 163 and 164, which may be of any approved design. The adjacent yoke members of the universal joints are coupled back to back as indicated by reference character 166, and the joints are associated in such manner that the angular velocity of rotation of the shaft 61 is the same as that of the propeller shaft 161. If desired, a bellows type leather seal may join the drive axle and the transmission, completely enclosing the universal joints and the sliding tubular drive shaft where it enters the transmission.

The drive axle 19 and the spring 18 are shown in their positions occupied with respect to the body framing 10 when the vehicle is loaded to its normal capacity, and the position of the universal joint is as illustrated by Figure 1 and by the full line in Figure 2. It will be noted from Figure 2 that in the normal load position illustrated in Figure 1 the center line 168 of the propeller shaft 161 is substantially parallel and in alignment with the center line 169 of the shaft 61, and it will be noted that the line 171 connecting the trunnions of the universal joints 163 and 164 is substantially aligned with the center lines of the shafts 61 and 161. The broken line 173 on Figure 1 represents the top of spring 18 when it experiences maximum upward deflection, and the position of the shaft and universal joints under this condition is illustrated by broken lines on Figure 2. It will be noted that springs 18 are connected to the vehicle frame 10 by means of fixed pivot 20, and that as the springs deflect upwardly it assumes the curve designated by the line 173 in Figure 1. Since the axle 19 is underslung beneath the spring 18 the center line 168 moves to a new position 176 which, by reason of the location of the axle 19 beneath the spring and the fixed pivotal connection of the spring 18 at 20 and the shackle connection 23, is substantially parallel to its previous position 168 and the angularity of the line connecting the two universal joints 163 and 164 is changed but slightly to compensate for the movement of the axle 19 with respect to the body 10.

The approximate total swing of the line connecting the trunnion centers of the universal joint is approximately only twenty degrees between full braking and full torque condition and this angle is not exceeded even when the shaft 61 is fully extended as for example, when spring 18 is curved downwardly during rebound.

The operation of the novel driving mechanism is believed to be obvious from the foregoing description, but is briefly as follows:

The change speed transmission mechanism, the clutch and other shiftable devices may be placed under control of an operator situated in a convenient position in the vehicle beside the control means similar to those illustrated and described in either of the above mentioned copending applications Serial No. 15,488 or Serial No. 729,115. The engine 12, positioned over the rear wheels, is controlled from the operator's station by suitable means, for example, those disclosed in my copending application Serial No. 15,085.

The telescoping joint provided by the hollow shaft 78 allows for free movement of the vehicle driving axle 19 with respect to the body 10 as the vehicle encounters irregularities in the surface of the roadway, and the spring arrangement described keeps the center lines of the shafts 61 and 161 practically parallel except when the engine is transmitting maximum torque to the road wheels or when brakes carried by the axle are applied. It is especially to be noted that with the arrangement described, in which the shaft 87 projects into shaft 61 to form the driving connection between the shafts 78 and 61, all of the side thrust is taken directly by the internal surface of the hollow shaft 78, thus relieving the shaft 87 of stresses which would otherwise be imposed upon it. The drive shaft 61 and the unusually short propeller shaft, together with the coupling of the universal joints 163 and 164 back to back in the manner described above, provide an efficient and compact driving connection between the engine and the driving wheels.

In the modified form of mechanism of Figure 5, the gear 63 abuts the shoulder 81 and is drivingly connected for rotation with the hollow shaft by the key 82. The inner race of the bearing 68 abuts the top of the gear, and a sleeve 171 is interposed between the inner race and a locking nut 172 which is threaded onto threads 174 provided for the purpose on the hollow shaft 78 adjacent its end. A locking device comprising a metallic ring 176 has one of its tongues seated in a keyway 177 and another tongue is engaged in a seat 178 formed on the nut 172 to effectively secure the nut against rotation.

The gear 63 and the inner race of the bearing 68 are clamped together axially on the hollow shaft 78 by means of the nut 172. A lubricant seal 180, positioned at the top of a bearing housing 181, prevents escape of lubricant from about the top of the shaft 78.

A shaft 182, which corresponds to shaft 87 of Figure 4, is splined at 183 and the splines are engaged with the internal splines 89 formed on the interior of the shaft 78 at its end. As in Figure 4, the brake carrying member 93 is connected for rotation with the shaft 78 by means of the splines 183. The split washer 96 provides an abutment whereby nut 99 can be used to hold the shaft 182 securely in position and also to clamp the member 93 against the axial face of the hollow shaft 78.

Splines 186, which correspond to the splines 103 of Figure 4 are engaged with the internal splines 104 to drive the shaft 61 while permitting said shaft freedom of axial movement within the hollow shaft 78. The bearing sleeves 107 and 108 guide the shaft 61 within the shaft 78. The bearing sleeves 107 and 108 are retained in position by a threaded sleeve 111 engaged over the end of the hollow shaft 78. Wiping members 112 prevent escape of lubricant from around the shaft 61 when it reciprocates axially in operation. The member 111 positions the inner race member of the bearing 70 against the shoulder 79 through the medium of an annular member 188 which is interposed between the bearing race and the end of the member 111.

Escape of lubricant from the interior of the casing 28 about the lower end of the shaft 78 is prevented by means of a bellows 189 sealed at one end to a cup-shaped member 190 and at its other end to a ring 191 which is pressed by a spring 192 against the ring member 188. The ends of this spring seat in recesses in the cup member 190 and the ring member 191. The cup member 190 is secured to a bearing housing 193 by means of rivets 194 engaged through a series of apertures in a flange 196 of the bearing housing 193 and through a flange 198 of the member 190. The assembled bearing housing and the member 190 are secured to the casing 28 by means of studs 199. Shims 201 are provided which correspond to shims 76 previously described in connection with Figure 4.

The telescoping driving mechanism of the modification just described is supplied with lubricant from the interior of the housing 28 and is sealed against escape of lubricant and entrance of dirt by the means described.

It will be seen from the foregoing complete description that in both forms of my invention I have provided a novel and compact driving arrangement for a motor vehicle which permits substantially all of the interior space of the vehicle body to be devoted to the carrying of passengers and which transmits power in a novel manner to the driving wheels of the vehicle upon which the vehicle frame is spring supported.

The invention may be embodied in other specific forms without departing from the spirit or essential characteristics thereof. The present embdoiments are therefore to be considered in all respects as illustrative and not restrictive, the scope of the invention being indicated by the appended claims rather than by the foregoing description, and all changes which come within the meaning and range of equivalency of the claims are intended to be embraced therein.

What is claimed and desired to be secured by United States Letters Patent is:—

1. In a power transmitting device for a motor vehicle, a hollow driving shaft, bearing means for said shaft, drive means for said hollow shaft, a hollow driven shaft nested in said hollow shaft and capable of axial movement therein, the nested relationship of said shafts affording transmission of side thrusts imposed on said driven shaft to said bearings through said hollow driving shaft, and means for imparting driving power from said hollow shaft to said relatively movable driven shaft, said means being connected to said driving shaft and extending into the interior of said driven shaft.

2. In a power transmitting device for a motor vehicle, a hollow driving shaft, drive means for said shaft, an internally splined driven shaft nested in said hollow shaft and capable of axial movement therein, an externally splined member having a driving connection at its end with an end of said hollow shaft, said externally splined member extending within and engaging the splined interior of said internally splined shaft whereby to transmit driving power from said hollow shaft to said relatively movable internally splined shaft, the nested relationship of said shafts affording transmission of side thrusts imposed on said driven shaft directly to said hollow shaft and thereby relieving said splined connection of stresses that would otherwise result from said side thrusts.

3. In a power transmitting device for a motor vehicle, a hollow driving shaft; means for driving said shaft, a hollow driven shaft nested in said driving shaft and capable of axial movement therein, a bearing sleeve interposed between said shafts, and means extending into said hollow driven shaft for connecting said shafts in driving relation.

4. The combination defined in claim 3 wherein said driving shaft is provided with a helical channel in the region of said bearing designed to convey oil thereto.

5. In a power transmitting device for a motor vehicle, a housing, bearing supports and bearings received in aligned apertures in said housing, a hollow shaft journalled in said bearings, an extensible shaft structure nested in said hollow shaft and extending through one of said bearing supports, and a lubricant seal in said one bearing support surrounding said hollow shaft at one end thereof to prevent escape of lubricant from said housing and to preclude entrance of dirt into said housing.

6. The combination of claim 5 wherein there is a lubricant seal between the end of said hollow shaft and said extensible shaft.

7. The combination of claim 5 wherein said lubricant seal comprises a flexible shell secured at one end to said housing and yieldably engaging a shoulder means carried by said hollow shaft.

8. The combination of claim 5 wherein said lubricant seal comprises a member rotatable with said hollow shaft and yieldably engaging a surface carried by said bearing support.

9. In a power transmitting device for a motor vehicle, a housing adapted to contain lubricant, a substantially vertical hollow shaft journalled adjacent each end in bearings supported by said housing, a gear on said hollow shaft, a reciprocating shaft nested in said hollow shaft, a drive shaft within said hollow shaft in driving connection therewith and having a splined connection with said reciprocating shaft, and means to effectively lubricate said splined connection and other relatively movable contacting parts from the supply of lubricant contained within said housing.

10. In a power transmitting device for a motor vehicle, the combination of a hollow vertical driving shaft, a drive shaft having a splined portion surrounded by said hollow driving shaft and having a portion protruding above said driving shaft, a brake member secured on the protruding portion of said drive shaft, and an axially slidable power take-off shaft fitted between said driving and drive shafts and having a splined portion receiving said splined portion of said drive shaft.

11. In a power transmitting device for a motor vehicle, the combination of a hollow vertical driving shaft, a splined drive shaft carried by said hollow driving shaft and protruding above said driving shaft, a split washer carried by said splined shaft, a shoulder formed in said hollow driving shaft designed to provide an abutment for said washer, a gear wheel carried on said hollow driving shaft and designed to drive it, an anti-friction bearing supporting said hollow driving shaft and abutting said gear, a sleeve surrounding said driving shaft in abutting relation to said bearing and protruding beyond the end of said driving shaft, a brake spider disposed on the protruding end of said splined drive shaft in abutment with said sleeve, a threaded extension on the protruding portion of said splined drive shaft and a nut threadedly secured on said extension designed to engage said brake spider and secure said gear, said bearing, and said sleeve on said hollow driving shaft, said splined drive shaft within said hollow driving shaft and said brake spider upon said splined drive shaft.

12. A power transmitting device for motor vehicles comprising a housing having opposed open ends, an extensible drive shaft assembly disposed in said housing with its ends protruding through said open ends, removable caps having lubricant seals and bearing assemblies designed to close said open ends and rotatably support said drive shaft assembly, a gear secured to and designed to drive said drive shaft assembly, a driving gear designed to mesh with said last mentioned gear and supply driving torque thereto, and an enlarged formation on said housing designed to receive said drive gear.

13. In a power transmitting device for a motor vehicle, a housing, an extensible propeller shaft assembly disposed substantially vertically in said housing, bearings carried by opposite walls of said housing and supporting said shaft adjacent the upper and lower ends thereof, a gear carried by said shaft, said housing being designed to contain lubricant at a level between said bearings and below said gear, said propeller shaft assembly including a telescoping portion extending outwardly of said housing thru the bearing adjacent its lower end, sealing means associated with said shaft assembly and said last named bearing, a pump unit mounted in said housing above said lower bearing having an inlet below said lubricant level and also having a discharge opening, means to conduct lubricant from said discharge opening to said other bearing and said gear, and means to operate said pump from said shaft.

14. In a power transmitting device for a motor vehicle, a housing, a substantially vertical propeller shaft disposed in said housing, bearings carried by said housing and journalling said shaft adjacent its upper and lower ends, said propeller shaft being hollow, an extensible shaft arranged within said propeller shaft and supported for sliding movement therein, said housing being designed to contain lubricant at a level between said bearings, means carried by said housing for raising lubricant to the bearing positioned above said lubricant level, and means to conduct lubricant to the interior of said hollow propeller shaft for lubricating the mutually engaging surfaces of said propeller shaft and said extensible shaft.

15. In a power transmitting device, the combination set forth in claim 14, wherein said extensible shaft is hollow and provided with internal splines, together with an externally splined member drivingly connected to said propeller shaft and engaging said internal splines, and means for conducting a portion of the lubricant raised to said bearing to said splines.

16. In a power transmitting device the combination set forth in claim 13 wherein said housing comprises a wall portion extending vertically and substantially parallel to said propeller shaft, said wall being provided with an opening and a vertically extending passage, said passage terminating above the uppermost of said bearings and also communicating with said openings, and said pump comprising a unitary structure adapted to be received in and closing said opening and having a discharge port registering with said passage.

WILLIAM B. FAGEOL.

CERTIFICATE OF CORRECTION.

Patent No. 2,118,812.　　　　　　　　　　　　　　　May 31, 1938.

WILLIAM B. FAGEOL.

It is hereby certified that error appears in the printed specification of the above numbered patent requiring correction as follows: Page 4, second column, line 44, claim 1, before the word "shaft" first occurrence, insert driving; page 5, second column, line 68, claim 16, for "openings" read opening; and that the said Letters Patent should be read with these corrections therein that the same may conform to the record of the case in the Patent Office.

Signed and sealed this 5th day of July, A. D. 1938.

(Seal)

Henry Van Arsdale,
Acting Commissioner of Patents.